(12) United States Patent
Mirandette et al.

(10) Patent No.: US 8,284,786 B2
(45) Date of Patent: Oct. 9, 2012

(54) METHOD AND SYSTEM FOR CONTEXT AWARE DEEP PACKET INSPECTION IN IP BASED MOBILE DATA NETWORKS

(76) Inventors: Olivier Mirandette, Montreal (CA);
Mathieu Caron, Montreal (CA);
Sébastien Nobert, Montreal (CA); Eric Mélin, Montreal (CA)

( * ) Notice: Subject to any disclaimer, the term of this patent is extended or adjusted under 35 U.S.C. 154(b) by 189 days.

(21) Appl. No.: 12/691,055

(22) Filed: Jan. 21, 2010

(65) Prior Publication Data
US 2010/0189004 A1  Jul. 29, 2010

Related U.S. Application Data

(60) Provisional application No. 61/146,770, filed on Jan. 23, 2009.

(51) Int. Cl.
*G06F 15/173* (2006.01)

(52) U.S. Cl. ......... 370/401; 709/223; 709/224; 370/252

(58) Field of Classification Search ........................ None
See application file for complete search history.

(56) References Cited

U.S. PATENT DOCUMENTS

| | | | |
|---|---|---|---|
| 7,299,277 B1 | 11/2007 | Moran et al. | |
| 7,313,108 B2 | 12/2007 | Scobbie | |
| 7,522,530 B2 | 4/2009 | Fdida et al. | |
| 2008/0120413 A1* | 5/2008 | Mody et al. | 709/226 |
| 2009/0052454 A1* | 2/2009 | Pourcher et al. | 370/392 |
| 2009/0138593 A1* | 5/2009 | Kalavade | 709/224 |
| 2009/0252041 A1* | 10/2009 | Dolganow et al. | 370/241 |
| 2010/0054204 A1* | 3/2010 | Dolganow et al. | 370/331 |
| 2011/0265109 A1* | 10/2011 | Goyet et al. | 725/9 |
| 2011/0280143 A1* | 11/2011 | Li et al. | 370/252 |

* cited by examiner

*Primary Examiner* — Donald Mills (57) ABSTRACT

The present method and system perform context aware deep pack inspection in a mobile IP data network. For doing so, the method and system collect real time data from mobile IP data sessions, analyze the real time data and differentiate user data traffic from control traffic. Then, the method and system extract control information from the control traffic and create a subscriber context. The subscriber context comprises the at least one unique identifier and the corresponding IP address.

14 Claims, 4 Drawing Sheets

Figure 4

METHOD AND SYSTEM FOR CONTEXT AWARE DEEP PACKET INSPECTION IN IP BASED MOBILE DATA NETWORKS

FIELD

The present method and system generally relate to a Deep Packet Inspection (DPI) probe optimized for IP based packet analysis in a Mobile Operator data network. More specifically, the present method and system perform context aware Deep Packet Inspection, taking into account specificities of data traffic in mobile networks. A generic DPI unit analyzes data traffic, using standard Deep Packet Inspection mechanisms. A specialized DPI unit analyses control traffic, to generate a subscriber context. This subscriber context contains information specific to the mobile network environment, as well as additional subscriber centric information. The combination of the subscriber context with the information extracted by the generic DPI unit generates value added data to analyze the traffic on the mobile network, with a granularity at the subscriber level.

BACKGROUND

The technology of Deep Packet Inspection (DPI) is well known in the art. In the context of Internet Protocol (IP) networking, it consists in analysing protocol layers 2 to 7 of the OSI model. Each layer contains information related respectively to the link (2), network (3), transport (4), session (5), and application (6 and 7) levels.

A DPI probe is capable of correlating information at the different protocol layers to recognize a specific application or service, and the attributes and parameters that relate to it. For example, a web session based on Hypertext Transfer Protocol (HTTP) at the application layer relies on Transport Control Protocol (TCP) at the transport layer. Contextual information is used by the probe to establish a relation between the HTTP session and the multiple transport TCP protocol exchanges associated to this specific HTTP session.

The probe also relies on contextual information to follow the data flow related to a specific session over its duration. The File Transfer Protocol (FTP) is an example where the use of contextual information is necessary. FTP is an application protocol to transfer data over an IP network. It relies on the TCP protocol for the transport layer. The control session (to establish and control an FTP session between a client and a server) and the data session (to perform the effective data transfer between the client and server) are separated. The control session contains information related to the TCP parameters of the data session. Thus, memorizing contextual information is necessary for the probe to correlate the TCP control and data sessions, which otherwise would appear as two independent TCP sessions.

The aforementioned functionalities constitute what is referred to as a generic DPI probe. It is capable of capturing data related to almost any kind of application or service based on the Internet Protocol. Context information associated to different protocol layers are used to follow the session from its beginning to its end, and extract relevant parameters. The most advanced DPI probes can track a service based on several different IP based applications, involving multiple underlying transport protocol sessions.

However, with a generic DPI probe, a specific device or group of devices cannot be followed over a long time period. This is due to the fact that a DPI probe uses the IP address of the device as its identification. And in many cases, this IP address is not the same over time. In particular, in the context of mobile networks, the IP address allocated to a mobile device for a data session is usually different for each new data session.

Also, a generic probe usually does not take into account the specificities of the IP network in which it is used (for instance, a corporate IP network, an IP based mobile data network, an IP based fixed broadband network). Specifically, part of the signalling IP traffic dedicated to the operation of a mobile data network contains critical information, associated to each device and/or subscription. For instance, in the case of a cellular network: a subscription identifier, a mobile device identifier, a phone number, localization information, among others.

Additionally, in the case of a cellular data network, the DPI probe may be deployed at different points of capture in the network. Thus, part of the information to be captured may be transported over different IP based protocols, depending on the localization of the probe. A generic DPI probe usually does not have the capability to automatically adapt to various points of capture, where the same information is transported via different IP based protocols.

Therefore, there is a need of overcoming the above discussed issues, concerning the limitations of a generic DPI probe focusing on the analysis of IP based data traffic generated by mobile devices on a mobile data network. Accordingly, a method and system for context aware Deep Packet Inspection in IP based mobile data networks are sought.

An object of the present method and system is therefore to provide a context aware DPI for IP based mobile data networks.

The foregoing and other objects, advantages and features of the present method and system will become more apparent upon reading of the following non-restrictive description of any illustrative embodiments thereof, given by way of example only with reference to the accompanying drawings.

DETAILED DESCRIPTION

Generally stated, a non-restrictive illustrative embodiment of the present method and system performs context aware Deep Packet Inspection (DPI) in IP based mobile data networks. The method and system collecting real time data from mobile IP data sessions analyze the real time data and differentiate user data traffic from control traffic. Then, the method and system extracting control information from the control traffic and create a subscriber context there from. The control information comprises at least one unique identifier of one of the mobile devices and a corresponding IP address. The subscriber context comprises the at least one unique identifier and the corresponding IP address.

In one specific aspect, the method and system are based on a probe with two distinct units performing DPI. The first unit is a generic DPI engine to analyze and classify data traffic according to different layers of the IP protocol. In the context of the present method and system, the data traffic refers to the IP traffic generated by a mobile device directly in relation to the use of an application or a data service. The second unit is a specialized DPI engine to analyze the control traffic of the mobile data network. This second DPI unit generates contextual information. The combination of the data traffic classification from the first DPI unit and the contextual information from the second DPI unit generates value added information. More specifically, this value added information consists in a fine grained analysis and classification of the data traffic, with the capability to follow one or several mobile devices over time. This value added information also consists in the correlation of the information extracted from the data traffic with mobile network specific information, extracted from the control traffic.

Additionally, the subscriber centric control information analyzed by the second DPI unit can be conveyed via different control protocols, depending on the point of capture in the mobile data network. It is therefore an object of the present method and system to automatically adapt to a specific point of capture, and extract contextual information for each individual subscriber from the appropriate control protocols.

Also, the subscriber specific contextual information gathered by the second specialized DPI unit can be of two types. Part of it is directly related to the mobile networking environment (for instance, a mobile subscriber identifier, a mobile device identifier). And part of it is related to other signaling protocols associated to the IP based data traffic (for instance, a subscriber DNS cache).

Figure 1:
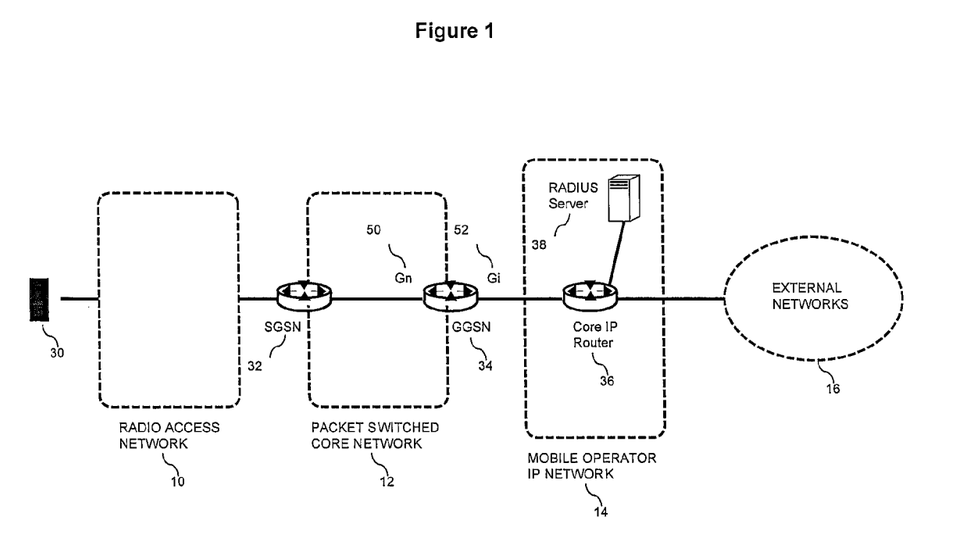
FIG. 1 is a schematic view of a GPRS or UMTS mobile data network, according to a non-restrictive illustrative embodiment.

Now referring to FIG. 1, a schematic view of a GPRS or UMTS mobile data network will be described.

A General Packet Radio Service (GPRS) or Universal Mobile Telecommunications System (UMTS) mobile data network is split into several functional entities: a radio access network 10, a packet switched core network 12, and a Mobile Operator IP network 14. The radio access network 10 differs in the case of GPRS and UMTS. It transports both the packet switched (data) traffic and the circuit switched (voice) traffic originating from a mobile device 30. However, the radio access network 10 is usually not a good candidate for capturing IP based data traffic via a DPI probe, and will no longer be considered in the following.

The packet switched core network 12 is similar in the case of GPRS or UMTS. Its purpose is to relay the IP based data traffic between the radio infrastructure 10 of the mobile network and the Mobile Operator IP based network infrastructure 14. It consists in two main components. First, a Serving GPRS Support Node (SGSN) 32 interconnects the radio access network 10 and the packet switched core network 12. Then, a Gateway GPRS Support Node (GGSN) 34 interconnects the Mobile Operator IP network 14 and the packet switched core network 12. The GGSN 34 is an equipment with cellular specific functionalities, as well as with many functionalities of a standard IP router.

The Mobile Operator IP network 14 interconnects the mobile network data infrastructure (including the packet switched core network 12) with external networks 16, using core IP routers 36. The external networks 16 consist in (among others) the Internet, other Mobile Operator data networks, Internet Service Provider (ISP) networks providing inter Operator interconnection services. They all support IP based networking. Additionally, the Mobile Operator IP network 14 includes servers hosting Mobile Operator applications and services, for example an IP Multimedia Subsytem (IMS). It also includes dedicated IP based control and signaling servers, like a Remote Authentication Dial In User Service (RADIUS) server 38 (for authentication/authorization/ accounting of mobile devices 30 using the Mobile Operator data services).

In this context, the GGSN 34 is the central equipment where all inbound and outbound IP traffic converges. The Third Generation Partnership Project (3GPP) standardization body has defined two interfaces of the GGSN that are of particular interest for the deployment of a DPI probe.

The Gn interface 50 interconnects the GGSN 34 and the SGSN 32. It relies on a dedicated tunneling protocol, the GPRS Tunneling Protocol (GTP), to transport all IP based data traffic originating from and targeted to the mobile devices 30 (it is referred to as the GTP data plane). GTP also has a control plane, to transport IP based signaling traffic specific to the mobile data network operations. Thus, the Gn interface 50 is a good point of capture for a DPI probe to collect both data traffic and control traffic.

The Gi interface 52 interconnects the GGSN 34 and core IP routers 36, providing access to external networks 16 and the Mobile Operator IP network 14. The Gi interface 52 transports all IP based data traffic originating from and targeted to the mobile devices 30. It also transports signaling traffic specific to the mobile data network operations, like the control protocol (authentication/authorization/accounting messages) related to the RADIUS server 38. Thus, the Gi interface 52 is also a good point of capture for a DPI probe to collect both data traffic and control traffic.

Figure 2:
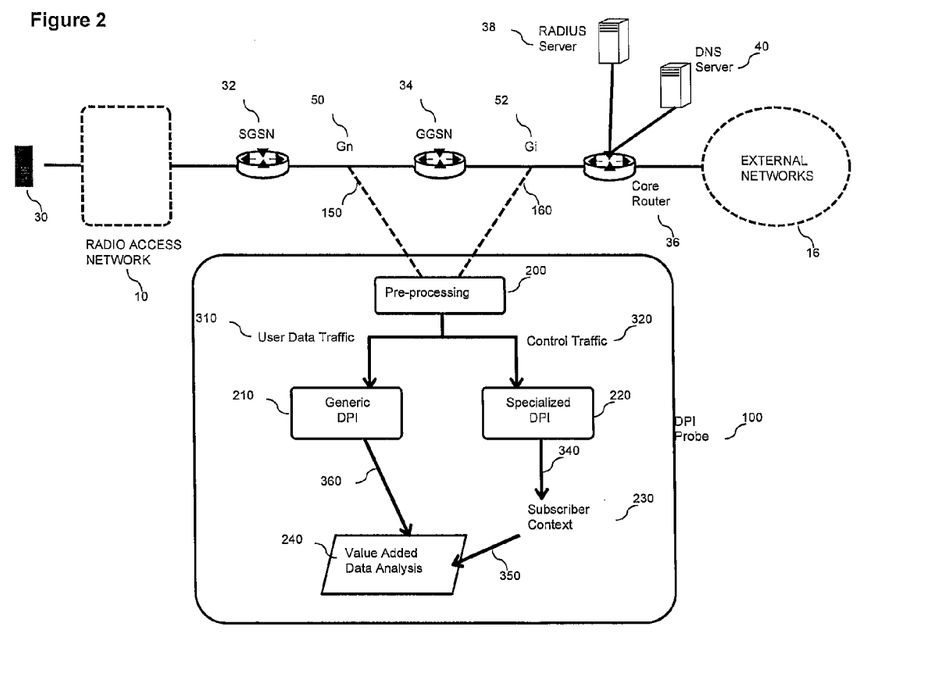
FIG. 2 illustrates a system for context aware Deep Packet Inspection in a mobile data network, according to a non-restrictive illustrative embodiment.
Figure 3:
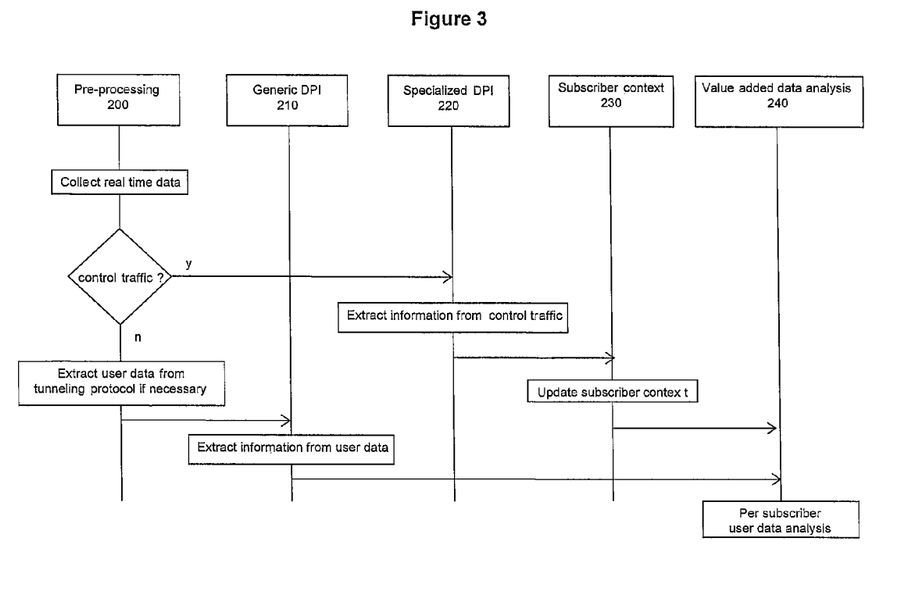
FIG. 3 illustrates a method for context aware Deep Packet Inspection in a mobile data network, according to a non-restrictive illustrative embodiment.

Referring now concurrently to FIGS. 2 and 3, a method and system for context aware Deep Packet Inspection in a mobile data network will be described. For illustration purposes, a GPRS or UMTS mobile data network will be considered, but the present method and system is not limited to such mobile data networks. The depicted GPRS or UMTS network may comprise many other entities not represented for clarification purposes.

Two distinct deployments of a DPI probe 100 are considered. In the first deployment, the traffic on the Gn interface 50 is intercepted 150 by the DPI probe 100. In the second deployment, the traffic on the Gi interface 52 is intercepted 160 by the DPI probe 100.

The choice between the two possible deployments is dependent on Mobile Operator considerations. For instance, the Mobile Operator may give access exclusively to the Gn interface 50 or to the Gi interface 52, based on operational, security or confidentiality issues.

In both deployment scenarios, the DPI probe 100 contains a generic DPI unit 210 to analyze the IP based data traffic. This generic DPI unit 210 is well known in the art. It is capable of analyzing and classifying almost any type of IP based applicative protocol used by the mobile subscribers. Examples of such applicative protocols include, among others, web browsing, audio and video streaming, web 2.0 social networking, on-line gaming, and mobile television. Specifically, the generic DPI unit 210 extracts information from the collected data traffic, analyzes this information, and generates records consisting of one or several of the following: a type of application/service used (classification), parameters specific to this application/service, timestamps to identify the beginning and duration of use of the application/service, etc.

Figure 4:
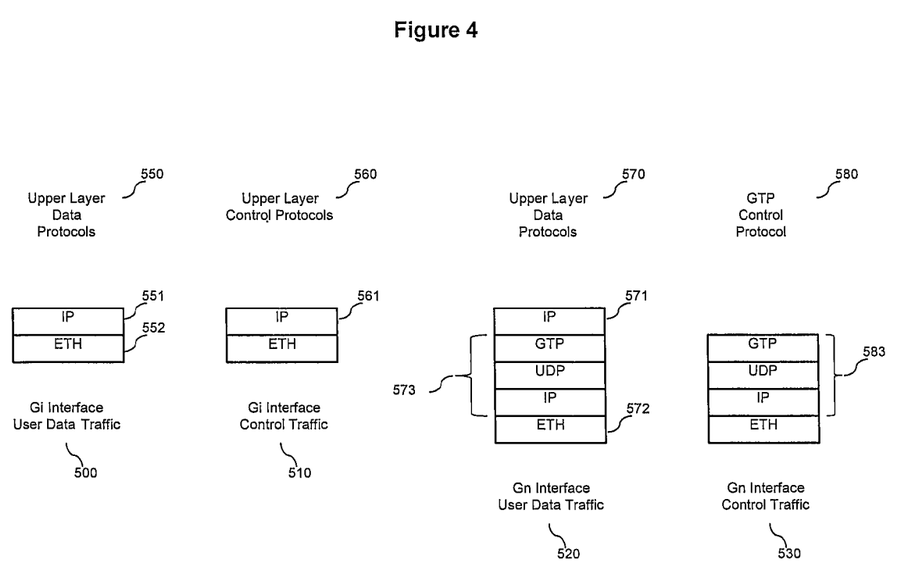
FIG. 4 illustrates user data and control traffic on Gi and Gn interfaces of an UMTS or GPRS mobile data network, according to a non-restrictive illustrative embodiment.

FIG. 4 illustrates the protocol layers involved in the analysis of data traffic on the Gi interface 500 and on the Gn interface 520. The upper layer data protocols (layer 4 to 7 of the OSI model) for the Gi interface 550 are exactly the same as the upper layer data protocols for the Gn interface 570. The only difference is at the layer 3. In the case of the Gi interface, the Ethernet protocol 552 and the IP protocol 551 are used for layer 2 and layer 3. In the case of the Gn interface, there is an additional encapsulation layer due to the GTP tunneling protocol. Thus, between the Ethernet protocol 572 and the IP protocol 571, GTP encapsulation 573 takes place, consisting in additional IP, UDP and GTP protocol layers.

Coming back to FIG. 2, a specific requirement on the generic DPI unit 210 of the DPI probe 100 is thus to extract data encapsulated in the GTP tunneling protocol. Basically, it consists in identifying the GTP tunneling protocol 573 of FIG. 4 and extracting the protocol layers 571 and 570 on top of it. However, generic DPI units usually do not have this capability.

One important feature of the present method and system is to be able to use any type of generic DPI unit 210 with appropriate capabilities for analyzing IP based protocol layers from an applicative point of view (the protocol layers 551, 550, 571 and 570 represented in FIG. 4). A generic DPI unit 210 with no capability to analyze the GTP protocol should still be useable in the context of the present method and system. Thus, the DPI probe 100 includes a pre-processing unit 200, where all the traffic extracted from the Gn interface 50 or the Gi interface 52 is pre-processed. The pre-processing unit 200 has the capability to deal with the GTP tunneling protocol 573 of FIG. 4. In the case of the Gi interface, the IP layer 551 and the upper layer data protocols 550 of FIG. 4 are directly transmitted to the generic DPI unit 210 for further analysis. In the case of the Gn interface, the IP layer 571 and the upper layer data protocols 570 of FIG. 4 are extracted from the GTP layers 573 and transmitted to the generic DPI unit 210 for further analysis.

The pre-processing unit 200 may further make a distinction between the data traffic 310 and the control traffic 320 of the mobile data network. This distinction is not obvious and will be detailed in the following, when addressing the treatment of the control traffic. Thus, the role of the pre-processing unit 200 is also to differentiate data traffic (to be analyzed by the generic DPI unit 210) from control traffic (to be analyzed by the specialized DPI unit 220).

The DPI probe 100 contains a specialized DPI unit 220 to analyze the control traffic. Depending on the point of capture (the Gn interface 50 or the Gi interface 52), the control protocols are different, but the same type of information may be extracted from both interfaces.

Starting with the Gn interface and referring concurrently to FIGS. 2 and 4, an illustration of the protocol layers 530 involved in the capture of the control traffic on the Gn interface is given. The GTP control protocol 580 contains the control information specific to the mobile data network environment. It is transported via the GTP tunneling protocol layers 583, consisting in IP, UDP and GTP protocol layers.

The pre-processing unit 200 recognizes and directs the GTP control traffic 530 to the specialized DPI unit 220. Then, the GTP control protocol 580 is extracted from the GTP tunneling protocol layers 583, and analyzed by the specialized DPI unit 220 to collect the information that is related to a subscriber context 230.

Before being able to send or receive IP based data traffic, a Packet Data Protocol (PDP) context must be created on the SGSN 32 and on the GGSN 34, for each mobile device 30 engaged in a user data session. This PDP context is a data structure containing all the necessary information to properly handle the data traffic generated by the mobile device 30 on these two equipments (SGSN and GGSN). Dedicated GTP control protocol messages are exchanged between the SGSN 32 and the GGSN 34 to create and manage the PDP context.

The following information is always present in the GTP control protocol messages (such as for example PDP context creation messages) and is extracted by the specialized DPI unit 220: IP address allocated to the mobile device 30, International Mobile Subscriber Identity (IMSI) and Mobile Subscriber ISDN (MSISDN). The IMSI is a unique identifier corresponding to a mobile service subscription. The MSISDN is the phone number allocated to the mobile device 30 and can also be considered as a unique identifier. The IP address allocated to the mobile device 30 for the current PDP context is not fixed, and may differ for each new PDP context creation for the same mobile device 30. The association of the IP address with one of the unique identifiers (e.g. IMSI or MSISDN) enables the DPI probe 100 to follow the activity of one or several specific mobile devices over time, even when the IP address changes upon each new PDP context creation. Since the generic DPI unit 210 of the DPI probe 100 only knows the IP address of the mobile device 30, which changes over time, it would not be possible to track the activity of a given mobile device over time, without relying on the subscriber context 230 created by the specialized DPI unit 220. The subscriber context 230 associates the current IP address of the mobile device 30 to the corresponding unique identifier (IMSI or MSISDN).

In addition, according to the UMTS specifications, it is possible to create several PDP contexts for the same mobile device 30; each of these PDP contexts having its own IP address allocated to the same mobile device 30. Usually, there is a main PDP context and optionally one or several secondary PDP contexts (for instance, to support applications with different Quality of Service), with potentially several different IP addresses allocated to the mobile device 30. All these different IP addresses are associated to one of the unique identifiers (IMSI or MSISDN) by the specialized DPI unit 220 in the subscriber context 230.

Additional information is optionally present in the GTP control protocol messages and may be extracted by the specialized DPI unit 220 if available. Among others, the following additional information may be available: the International Mobile Equipment Identity (IMEI), the Radio Access Technology (RAT), the Access Point Name (APN) and the Routing Area Identity (RAI). These parameters, if present, may be added to the subscriber context 230. Combined with the data extracted by the generic DPI unit 210, they provide context sensitive information about the IP based applications and services consumed over the mobile device 30. For example, the IMEI is used to recognize the model of the mobile device used. The RAI is used to localize the mobile device (for example, which radio cell it is currently connected to). The value added data analysis unit 240 performs the analysis to combine the information of the generic DPI unit 210 with the information of the subscriber context 230.

Now turning to the Gi interface, FIG. 4 illustrates the protocol layers 510 involved in the capture of the control traffic on the Gi interface. There is no GTP control protocol on the Gi interface, the control traffic specific to the mobile data network environment is transported on top of the IP layer 561. It is represented as the upper layer control protocols 560 in FIG. 4.

Coming back to FIG. 2, the control traffic on the Gi interface 52 includes the authentication/authorization/accounting messages between the GGSN 34 and the RADIUS server 38. These authentication/authorization/accounting messages contain the same type of information as the GTP control messages related to the management of the PDP contexts on the Gn interface 50. Specifically, the PDP context management procedures between the SGSN 32 and the GGSN 34 trigger RADIUS procedures between the GGSN 34 and the RADIUS server 38.

A RADIUS authentication/authorization process authenticates the mobile devices and/or mobile subscriptions allowed to use the mobile data network, and authorizes them to do so by allocating an IP address. Thus, the IP address of the mobile device 30 is present in the RADIUS messages. Alternatively, the RADIUS server 38 may only authenticate and authorize the mobile devices and/or mobile subscriptions, but the IP address may be allocated to the mobile device 30 separately, via a DHCP server or by the GGSN itself (from a local pool). Even in this case, the RADIUS messages include the IP address allocated to the mobile device 30, as an informative element. A RADIUS accounting process relays information, such as the amount of data consumed by the mobile device 30 and/or the duration of the related data sessions, from the GGSN 34 to the RADIUS server 38.

The information extracted from the GTP control traffic on the Gn interface 50 can also be extracted on the Gi interface 52, by analyzing the RADIUS messages exchanged between the GGSN 34 and the RADIUS server 38. It is dependent on specific network deployment options, whether a single or a combination of the authentication/authorization/accounting RADIUS messages shall be considered for this purpose.

The pre-processing unit 200 recognizes the RADIUS traffic and directs it to the specialized DPI unit 220. Then, the RADIUS authentication/authorization/accounting messages are analyzed by the specialized DPI unit 220 to extract the parameters that are part of the subscriber context 230.

The following information is typically present in the RADIUS authentication/authorization/accounting messages and is extracted by the specialized DPI unit 220: the IP address allocated to the mobile device 30 and the MSISDN. Thus, the association of the IP address of the mobile device 30 with the unique identifier of the subscription (MSISDN) is established in the subscriber context 230.

Additional information is optionally present in the RADIUS authentication/authorization/accounting messages and may be extracted by the specialized DPI unit 220: the IMSI, the IMEI, the RAT, the APN and the RAI. These parameters, if present, are added to the subscriber context 230.

As already mentioned, the parameters extracted from the RADIUS messages on the Gi interface 52 are exactly the same as those extracted from the PDP context management messages on the Gn interface 50. The main difference is that the IMSI is mandatory on the Gn interface 50 and optional on the Gi interface 52. Thus, the unique identifier, associated to the various IP addresses allocated to the mobile device 30 over time, is the IMSI for the Gn interface 50, is the IMSI (when present in the RADIUS messages) for the Gi interface 52, and is the MSISDN as an alternative to the IMSI (when not present in the RADIUS messages) for the Gi interface 52.

Additional information not directly related to the control traffic of the mobile data network may be added to the subscriber context 230. Such information is carried via control protocols directly related to the data traffic, like Domain Name System (DNS) protocol.

A DNS server 40 is represented in FIG. 2. It is located in the Mobile Operator IP network 14 (or alternatively in the external networks 16). In any case, the DNS signaling between the DNS server 40 and the mobile device 30 is captured either on the Gi interface 52 or on the Gn interface 50. The DNS packets captured by the DPI probe 100 are directed to the specialized DPI unit 220 by the pre-processing unit 200.

The result of the analysis of the DNS packets by the specialized DPI unit 220 is added to the subscriber context 230. It consists in a subscriber DNS cache: the Uniform Resource Locator (URL) requested via the DNS request and the resulting target IP address in the DNS response, are recorded in the appropriate subscriber context 230. This subscriber context 230 is identified by the source IP address of the DNS request (the address of the mobile device 30), which is matched to the IP address of the mobile device 30 recorded in the targeted subscriber context 230.

When the mobile device 30 accesses an IP service associated to a URL, the corresponding data traffic is analyzed by the generic DPI unit 210, which is not capable to associate the destination IP address with the matching URL. The subscriber DNS cache is used (by the value added data analysis unit 240) to perform this association. It is particularly interesting in the case where different mobile devices access the same service via different URLs (the URL employed by a given mobile device contains information specific to this mobile device), but the IP address returned by the DNS server to access the service is the same for all the mobile devices. Each mobile device accesses the service with the common destination IP address, and the subscriber DNS cache is used to retrieve the specific URL corresponding to a specific mobile device. For this purpose, the source IP address to access the service (which is the IP address of the mobile device 30) is used to identify the corresponding subscriber context 230. Then, the subscriber DNS cache of the corresponding subscriber context 230 is used to identify the URL corresponding to the destination IP address.

An illustration of this functionality consists in mobile devices accessing a mail server via the Post Office Protocol (POP). Subscriber1 (using a first mobile device) has an email address subscriber1@domain1 and subscriber2 (using another mobile device) an email address subscriber2@domain2. The email clients on the mobile devices 30 make a DNS request respectively on domain1 and domain2. They receive the same destination IP address corresponding to the mail server from the DNS server 40. They access the mail server with the returned IP address as destination IP address. The subscriber DNS cache is used to match this destination IP address to domain1 for subscriber1 and to domain2 for subscriber2. Using a reverse DNS query would most probably return the URL of the mail server itself, instead of domain1 or domain 2.

The present method and system have been described in the context of an UMTS or GPRS network. The principles of the method and system can be adapted to any type of mobile data network, including Long Term Evolution (LTE), Code Division Multiple Access (CDMA) and Worldwide Interoperability for Microwave Access (WIMAX). The main differences consist in the points of capture of the mobile data traffic and the control protocols to be analyzed by the pre-processing unit 200 and the specialized DPI unit 220. However, the generation of the subscriber context 230 based on the unique identifier, and the correlation (by the specialized DPI unit 220) of temporary IP addresses allocated to the mobile device 30 with this unique identifier in the subscriber context 230 can be generalized. Additionally, the extraction of information specific to the mobile data network context (from the control traffic 320 by the specialized DPI unit 220), and the memorization of this information in the appropriate subscriber context 230 can also be generalized. The other functionalities of the DPI probe previously described are not dependant on a specific type of mobile network, and can also be generalized.

As represented in FIG. 2, the DPI probe 100 is composed of the following sub-entities: the pre-processing unit 200, the generic DPI unit 210, the specialized DPI unit 220, the subscriber context 230, and the value added data analysis unit 240. The aforementioned entities and sub-entities may be independent or co-located autonomous software programs or processes, executed on a computer and exchanging information there between; except for the subscriber context 230 which is implemented in the memory of a computer.

The role of each unit has been previously detailed and will be summarized now, to give a comprehensive understanding of an embodiment of the present system architecture.

The global IP traffic (150 captured on the Gn interface 50 or 160 captured on the Gi interface 52 of FIG. 2) is received by the pre-processing unit 200. The pre-processing unit 200 performs a high level analysis of the global IP traffic. More particularly, the pre-processing unit 200 recognizes the data traffic 310, which is directed to the generic DPI unit 210 for further analysis. The pre-processing unit 200 further recognizes the control traffic 320, which is directed to the specialized DPI unit 220 for further analysis. The pre-processing unit 200 is also capable of extracting the data traffic 310 from encapsulating protocols, like for example the GTP tunneling protocol.

The generic DPI unit 210 is well known in the art and performs traditional IP based protocol analysis and classification. The generic DPI unit 210 operates on the data traffic 310 and recognizes the applications being used by the mobile device 30, and gathers additional information related to each specific type of application.

The specialized DPI unit 220 analyzes control protocols specific to the mobile data network environment, and extracts the associated information 340, which is aggregated in the subscriber context 230. It must be noted that the pre-processing unit 200 may be implemented as a sub-function of the specialized DPI unit 220, since the analytic capabilities of this pre-processing unit 200 are a subset of those required for the specialized DPI unit 220. The specialized DPI unit 220 analyzes mobile focused control protocols (like GTP and RADIUS, as previously discussed), in order to extract information like the IMSI, the MSISDN, the IP address allocated to the mobile device 30, and the IMEI. Additional control protocols may also analyzed; for instance the DNS protocol to generate a subscriber DNS cache, which is a sub-component of the subscriber context 230.

The subscriber context 230 memorizes the information 340 extracted by the specialized DPI unit 220, which constitutes the subscriber context 230. The subscriber context 230 is based on the unique identifier, and the correlation by the specialized DPI unit 220 of temporary IP addresses allocated to the mobile device 30, with the unique identifier in the subscriber context 230.

Finally, the value added data analysis unit 240 correlates the information 360 provided by the generic DPI unit 210 and the information 350 provided by the subscriber context 230. The result is a fine grained analysis of the data traffic on the mobile network, taking into account the specific subscriber context 230 and the characteristics of the mobile network environment. For this purpose, the value added data analysis unit 240 matches the information 360 provided by the generic DPI unit 210 in reference to the IP address allocated to the mobile device 30, with the information 350 of the corresponding subscriber context 230 (identified by the aforementioned IP address of the mobile device).

Although the present method and system have been described in the foregoing specification by means of several non-restrictive illustrative embodiments, these illustrative embodiments can be modified at will within the scope, spirit and nature of the following claims.

What is claimed is:

1. A system for performing context aware deep packet inspection in a mobile IP data network, the system comprising:
   a pre-processing unit for collecting real time data from mobile IP data sessions, analyzing the real time data and differentiating data traffic from control traffic;
   a Deep Packet Inspection (DPI) unit for:
      extracting control information from the control traffic and creating a subscriber context, the control information comprising a unique identifier of a mobile device and an IP address allocated to the mobile device, the subscriber context comprising the unique identifier of the mobile device and the IP address allocated to the mobile device; and
      extracting user data information from the data traffic, the user data information comprising the IP address of the mobile device and a classification of an application used on the mobile device; and
   a value added data analysis unit for correlating the user data information with a corresponding subscriber context, the correlation consisting in matching the IP address of the mobile device comprised in the user data information with the IP address allocated to the mobile device comprised in the corresponding subscriber context.

2. The system of claim 1, wherein the DPI unit comprises a generic DPI unit for extracting the user data information from the data traffic and a specialized DPI unit for extracting the control information from the control traffic.

3. A method for context aware deep packet inspection in a mobile IP data network, the method comprising:
   collecting real time data from mobile IP data sessions;
   analyzing said real time data to differentiate a data traffic from a control traffic;
   extracting control information from the control traffic by means of a DPI unit and creating a subscriber context, the control information comprising an unique identifier of a mobile device and an IP address allocated to the mobile device, the subscriber context comprising the unique identifier of the mobile device and the IP address allocated to the mobile device;
   extracting user data information from the data traffic by means of the DPI unit, the user data information comprising the IP address of a mobile device and a classification of an application used on the mobile device; and
   correlating the user data information with a corresponding subscriber context, the correlation consisting in matching the IP address of the mobile device comprised in the user data information with the IP address allocated to the mobile device comprised in the corresponding subscriber context.

4. The method of claim 3, wherein the user data information is further analyzed in relation to the corresponding subscriber context by combining the classification of an application used on the mobile device with information from the corresponding subscriber context.

5. The method of claim 3, wherein the mobile IP data network is one among a GPRS mobile IP data network, an UMTS mobile IP data network, an LTE mobile IP data network.

6. The method of claim 5, wherein the unique identifier is an IMSI.

7. The method of claim 6, wherein the control information includes a combination of at least one among the following additional information: MSISDN, IMEI, RAT, APN, RAI; and the subscriber context further comprises the combination.

8. The method of claim 5, wherein the unique identifier is an MSISDN.

9. The method of claim 8, wherein the control information includes a combination of at least one among the following additional information: IMSI, IMEI, RAT, APN, RAI; and the subscriber context further comprises the combination.

10. The method of claim 5, wherein the control traffic includes IP packets from the GPRS Tunneling Protocol control plane.

11. The method of claim 5, wherein the control traffic includes IP packets from the RADIUS protocol.

12. The method of claim 3, wherein the subscriber context includes a subscriber DNS cache.

13. The method of claim 12, wherein correlating the user data information with a corresponding subscriber context consists in correlating the IP address of a mobile device generating IP traffic related to a DNS server with a corresponding subscriber context; and the subscriber DNS cache of the corresponding subscriber context is updated with a requested URL and an associated IP address returned by the DNS server.

14. The method of claim 3, wherein the DPI unit comprises a generic DPI unit for extracting the user data information from the data traffic and a specialized DPI unit for extracting the control information from the control traffic.

* * * * *